(12) United States Patent
Zheng (10) Patent No.: US 11,250,291 B2
(45) Date of Patent: *Feb. 15, 2022

(54) INFORMATION DETECTION METHOD, APPARATUS, AND DEVICE

(71) Applicant: Advanced New Technologies Co., Ltd., Grand Cayman (KY)

(72) Inventor: Dandan Zheng, Beijing (CN)

(73) Assignee: Advanced New Technologies, Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,060

(22) Filed: Sep. 3, 2019

(65) Prior Publication Data

US 2020/0074216 A1 Mar. 5, 2020

(30) Foreign Application Priority Data

Sep. 4, 2018 (CN) .......................... 201811025620.5

(51) Int. Cl.
*G06K 9/62* (2006.01)
*G06K 9/46* (2006.01)
*G06N 3/04* (2006.01)
*G06N 3/08* (2006.01)

(52) U.S. Cl.
CPC .......... *G06K 9/6211* (2013.01); *G06K 9/4609* (2013.01); *G06K 9/4671* (2013.01); *G06N 3/0418* (2013.01); *G06N 3/08* (2013.01)

(58) Field of Classification Search
CPC .. G06K 9/6211; G06K 9/4671; G06K 9/4609; G06N 3/0418; G06N 3/08

USPC ......................................................... 382/190
See application file for complete search history.

(56) References Cited

U.S. PATENT DOCUMENTS

| | | | |
|---|---|---|---|
| 2015/0131912 A1* | 5/2015 | Kasthuri | G06K 9/4609 |
| | | | 382/202 |
| 2018/0108101 A1 | 4/2018 | Rodriguez et al. | |
| 2018/0130186 A1* | 5/2018 | Romanenko | G06K 9/4609 |

(Continued)

FOREIGN PATENT DOCUMENTS

| | | | |
|---|---|---|---|
| CN | 105894042 A | * | 8/2016 |
| CN | 105894042 A | | 8/2016 |
| CN | 106910185 A | | 6/2017 |

(Continued)

OTHER PUBLICATIONS

International Search Report and Written Opinion dated Oct. 24, 2019, in counterpart International Application No. PCT/US2019/049291.

(Continued)

*Primary Examiner* — Amandeep Saini
(74) *Attorney, Agent, or Firm* — Finnegan, Henderson, Farabow, Garrett & Dunner, LLP (57) ABSTRACT

An information detection method includes: determining key point information in a target identification from a target image based on a preset deep learning algorithm; obtaining an image of the target identification from the target image according to the key point information; and determining information of a preset field from the image of the target identification according to the image of the target identification and a preset identification template matching the target identification.

13 Claims, 7 Drawing Sheets

(56) References Cited

U.S. PATENT DOCUMENTS

2018/0373958 A1* 12/2018 Patel ............... G06T 7/174
2019/0065932 A1*  2/2019 Shen ............ G06Q 20/4016

FOREIGN PATENT DOCUMENTS

| CN | 107169493 A | * | 9/2017 |
| CN | 107169493 A |   | 9/2017 |
| CN | 107330429 A |   | 11/2017 |
| CN | 107832721 A | * | 3/2018 |
| CN | 107832721 A |   | 3/2018 |
| CN | 108021913 A |   | 5/2018 |
| CN | 108229299 A |   | 6/2018 |
| CN | 108320290 A |   | 7/2018 |

OTHER PUBLICATIONS

Sindhu, "Information Extraction from ID Cards—Using YOLOv2," URL:https://blog.francium.tech/information-extraction-fromId-cards-using-yolov2-e3c (Jul. 4, 2018), pp. 1-4.
Kim et al., "Crosscheck of Passport Information for Personal Identification," Springer-Verlag (Dec. 31, 2006), pp. 162-172.

* cited by examiner

INFORMATION DETECTION METHOD, APPARATUS, AND DEVICE

CROSS-REFERENCE TO RELATED APPLICATIONS

This application is based upon and claims priority to Chinese Application No. 201811025620.5, filed on Sep. 4, 2018, the entire content of which is incorporated herein by reference.

TECHNICAL FIELD

The present specification relates to the technical field of computers, and in particular, to a method, an apparatus, and a device for information detection.

TECHNICAL BACKGROUND

With continuous development of an electronic process of real-name authentication, as a weak real-name authentication solution, the electronic process of real-name authentication does not require users to go to a real-name authentication site to verify identifications and personal information, thus greatly saving costs of users and real-name authentication authorities (such as banks). Therefore, it is increasingly accepted by real-name authentication authorities.

Despite the above advantages, the electronic process of real-name authentication needs to implement text line detection for identifications of many different countries or regions in order to extract names, addresses, identification numbers and other information on the identifications. Moreover, characteristics of the identifications of different countries or regions are also different. Generally, the detection of text lines in an identification is realized by traditional graphic methods, such as schemes based on connected components or methods based on stroke width conversion. However, such detection methods may have low accuracies and complicated rules, and for new types of identifications, it is required to rewrite corresponding detection codes. Therefore, it is desired to establish a simple and universal way to detect information of key fields on an identification.

SUMMARY

In a first aspect, there is provided an information detection method. The method includes: determining key point information in a target identification from a target image based on a preset deep learning algorithm; obtaining an image of the target identification from the target image according to the key point information; and determining information of a preset field from the image of the target identification according to the image of the target identification and a preset identification template matching the target identification.

In a second aspect, there is provided an information detection apparatus. The apparatus includes: a key point determining module determining key point information in a target identification from a target image based on a preset deep learning algorithm; an identification obtaining module obtaining an image of the target identification from the target image according to the key point information; and a field information determining module determining information of a preset field from the image of the target identification according to the image of the target identification and a preset identification template matching the target identification.

In a third aspect, there is provided an information detection device. The device includes a processor and a memory configured to store instructions, wherein the processor is configured to execute the instructions to: determine key point information in a target identification from a target image based on a preset deep learning algorithm; obtain an image of the target identification from the target image according to the key point information; and determine information of a preset field from the image of the target identification according to the image of the target identification and a preset identification template matching the target identification.

In a fourth aspect, there is provided a non-transitory computer-readable storage medium having stored thereon instructions that, when executed by a processor of a device, cause the device to: determine key point information in a target identification from a target image based on a preset deep learning algorithm; obtain an image of the target identification from the target image according to the key point information; and determine information of a preset field from the image of the target identification according to the image of the target identification and a preset identification template matching the target identification.

In the technical solutions provided by the embodiments, key points of the target identification in the target image may be detected by the deep learning algorithm, so that a location of the target identification in the target image may be obtained, and by matching the detected target identification with the preset identification template, information of a preset field may be detected. For example, by comparison with the preset identification template, the information of a name field and/or the information of an address field in the target identification may be detected, so that the processing of detecting the information of the key field on the identification may be simplified. Moreover, the solutions are not limited by the type of the identification and may be applied to various types of identifications.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are merely examples rather than all embodiments consistent with the specification. All other embodiments obtained by a person of ordinary skill in the art based on the embodiments without creative efforts shall fall within the scope of the specification.

Figure 1:
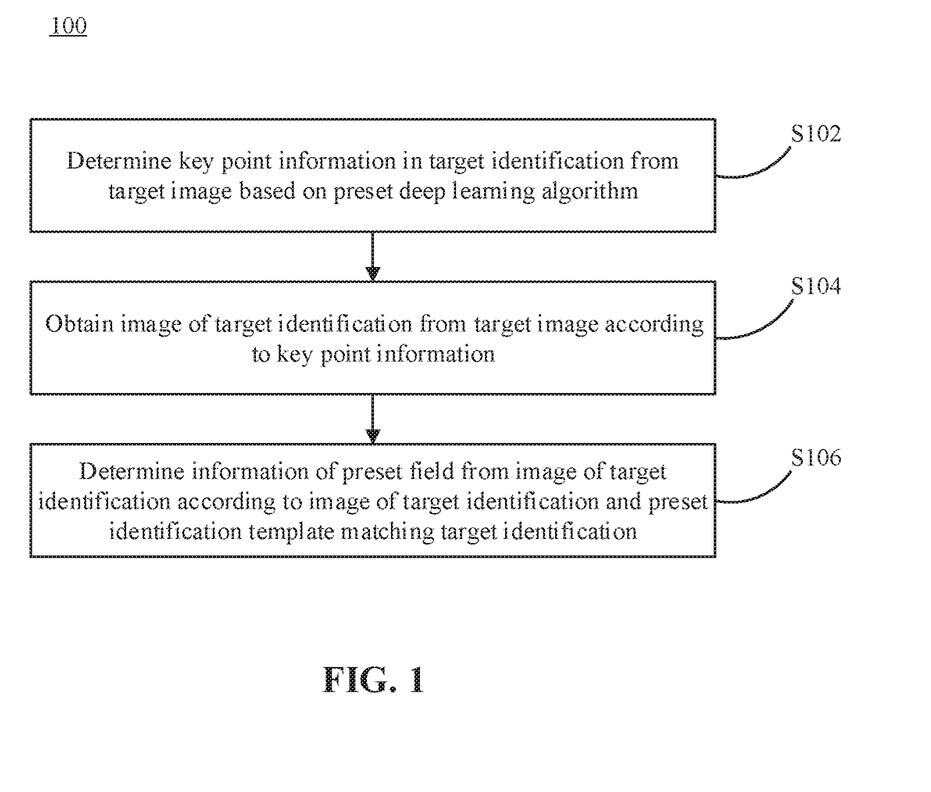
FIG. 1 is a flowchart of an information detection method according to an embodiment.

FIG. 1 is a flowchart of an information detection method 100 according to an embodiment. The method 100 may be executed by a terminal device or a server. The terminal device may be a personal computer or a mobile terminal device (e.g., a mobile phone or a tablet computer). The terminal device may be a terminal device used by a user. The server may be a stand-alone server, or a server cluster formed by multiple servers. Moreover, the server may be a background server of a service, or a background server of a website (e.g., a network shopping website or a payment application). The method 100 may be used for detecting the information of a key field on an identification. As an example, the method 100 may be executed by a server to improve the detection efficiency of the information as described in the following embodiments. As another example, the method 100 may be executed by a terminal device, which may be similar to the following embodiments. The method 100 may include the following steps.

In step S102, key point information in a target identification is determined from a target image based on a preset deep learning algorithm.

In some embodiments, the deep learning algorithm may be an algorithm based on representation learning of data in machine learning. The deep learning algorithms may be of many types, such as a k-nearest neighbor (kNN) algorithm or a convolutional neural network (CNN) algorithm. In some embodiments, the target image may be any image including an identification. For example, a user may take a photo of an ID card placed on a desk with a camera of a mobile phone, and during the shooting process, a part of an image of the desk (e.g., an image of the desktop around the ID card) may also be captured in the photo. The captured photo may be the target image. In some embodiments, the target identification may be a credential and/or a document used to prove an identity, experience, or the like. The target identification may include many types of forms. For example, the target identification may be a card of a preset size, or one or more credentials and/or documents of a preset size. In some embodiments, the key point information may be information of one or more prominent or notable positions, which may include position information or coordinate information of key points, or the like.

In some implementations, with continuous development of the electronic process of real-name authentication, as a weak real-name authentication solution, the electronic process of real-name authentication does not require users to verify identifications and personal information on site for real-name authentication, thus greatly saving costs of users and real-name authentication authorities (such as banks). Therefore, it is increasingly accepted by real-name authentication authorities. However, despite the above advantages, the electronic process of real-name authentication may need to implement text line detection for identifications of different countries or regions in order to extract names, addresses, identification numbers, and other information on the identifications. However, characteristics of the identifications in different countries or regions are different. For example, some countries or regions have multiple versions of identifications, and the names and addresses on the identifications may occupy 1-3 lines according to the length of their contents. Identifications of some countries or regions may have both English and a local language. Thus, it is desired to establish a simple and universal way to detect the information of key fields on the identifications.

In some embodiments, two ways may be used to detect text lines in an identification. One way may be implemented by graphic methods, such as connected-component schemes, text detection methods based on stroke width conversion, or edge-characteristics seeking schemes based on pixel variation, such as maximally stable extremal regions (MSER) schemes. For example, the purpose of the MSER is to find a region that can have significant changes with respect to the surrounding region. In detecting text lines in an identification, the graphic methods may have low accuracies and complicated rules. For newly emerging types of identifications, corresponding detection codes of MSER may need to be rewritten. The other way to detect text lines in the identification is a text detection method based on a deep learning target detection algorithm, such as a single shot multibox detector (SSD) algorithm, Faster RCNN, and other algorithms for text detection. For example, the SSD algorithm may predict category scores, offset, or the like of a series of default bounding boxes by virtue of a convolutional kernel on a feature map. In some embodiments, the process of the Faster RCNN algorithm may be: inputting a picture into a CNN to obtain a feature map; inputting convolutional features into a region proposal network (RPN) to obtain feature information of candidate boxes; determining, by a classifier, whether features extracted from the candidate boxes belong to a particular class; and for a candidate box belonging to a feature, adjusting the position of the candidate box using a regressor. The text detection based on the deep learning target detection algorithm may have higher accuracy. However, for texts in the identifications of different countries or regions, a large amount of data may be required to train a model. Moreover, it may be difficult to distinguish which field is name and which field is address, etc. Therefore, assistance of other rules or language models may be needed to further determine whether the text line in the identification belongs to a name or an address. Therefore, embodiments of the present specification provide a solution for detecting a text line in an identification, which is described as follows.

Considering that an image (e.g., the target image) may include not only an image of an identification (e.g., the target identification), but also an image other than the identification, and since the image other than the identification may not be useful in the text line detection of the target identification, the image of the target identification may be extracted from the target image. In some embodiments, it can be considered that the image of the target identification is determined by a plurality of key points.

Figure 2:
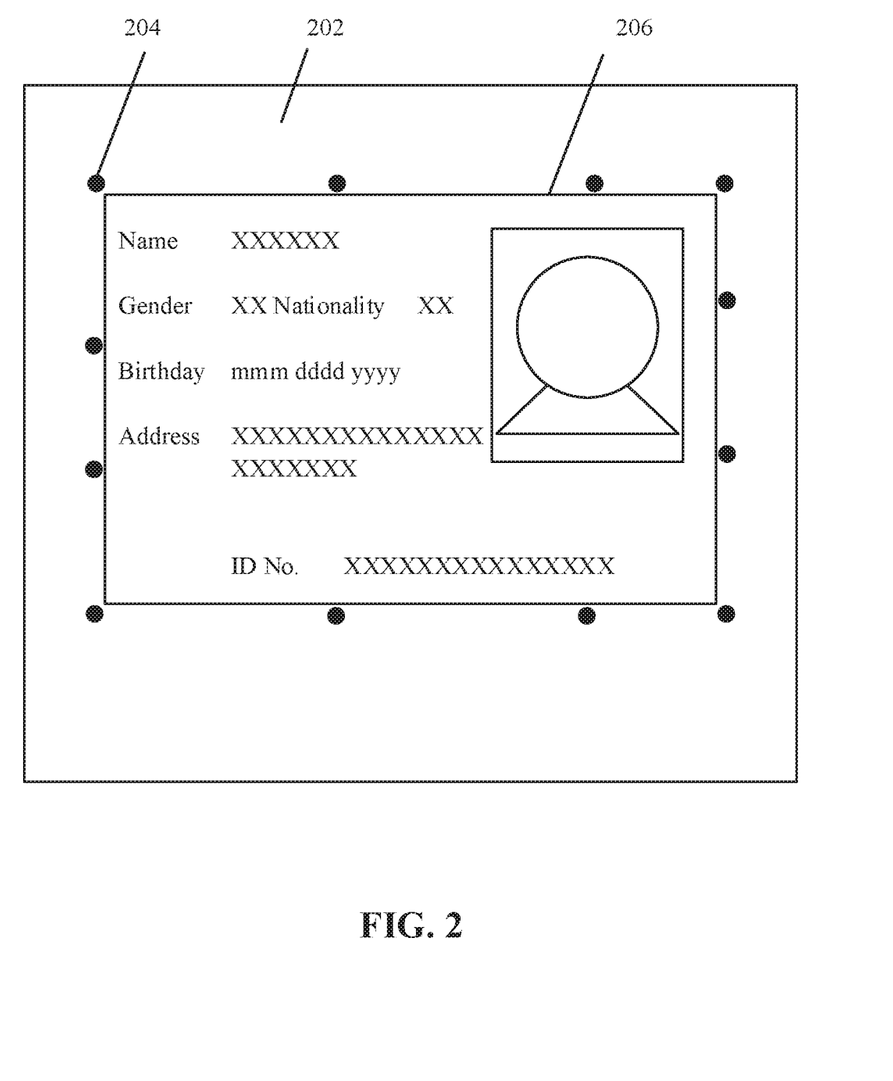
FIG. 2 is a schematic diagram of a target image of a target identification according to an embodiment.

FIG. 2 is a schematic diagram of a target image of a target identification according to an embodiment. For example, as shown in FIG. 2, points corresponding to the four corners of the target identification in a target image 202 may be used as key points 204, and corresponding points on the four edges of a target identification 206 in the target image 202 may also be used as key points 204, etc. In such a way, a region may be defined by the key points 204 corresponding to the four corners and the key points 204 corresponding to the four edges, which may be the region where the target identification 206 is located. For this reason, key point detection of the target identification 206 may be performed on the basis of a multi-patch key point positioning method. For example, a deep learning algorithm may be preset, which may be used to detect key point information of the identification from the image. Then, a certain number of sample images may be selected. Each sample image may include an image of an identification. The preset deep learning algorithm may be trained by the sample images to obtain a deep learning algorithm capable of detecting key point information of the identification included in the sample images from the sample images.

In some embodiments, after the deep learning algorithm is trained in the above manner, the target image may be input into the trained deep learning algorithm. Through the calculation with the trained deep learning algorithm, the key points corresponding to the four corners of the target identification and the key points corresponding to the four edges may be extracted from the target image. In some embodiments, the key points of the target identification may not be limited to the above-mentioned key points, and may also include other key points in addition to the above-mentioned key points.

Still referring to FIG. 1, in step S104, an image of the target identification is obtained from the target image according to the key point information.

In an embodiment, after the key point information in the target identification in the target image is obtained in step S102, the obtained key point information may be respectively set at corresponding positions in the target image, and then the key point information or a region defined by the key points may be determined. For example, the region defined by the key points corresponding to the four corners of the target identification and the corresponding key points on the four edges, as shown in FIG. 2, may be determined as a region where the target identification is located. Then the image of the above-described region may be extracted or intercepted from the target image as the image of the target identification.

In step S106, information of a preset field is determined from the image of the target identification according to the image of the target identification and a preset identification template matching the target identification.

In some embodiments, the preset identification template may be an identification having the same size, the same field name of each field, and the same relative position of each field on an identification, but the present identification template does not contain the contents of the fields. In some embodiments, the preset field may be any field determined in advance, such as a name field, an address field, a gender field, or the like.

In some embodiments, in order to identify different fields and the corresponding information of the fields, one or more identification templates may be pre-configured, which may match identifications commonly used. When the image of the target identification is obtained in step S104, in order to be able to match a preset identification template, the image of the target identification may be scaled to match the size of the preset identification template. Then a preset identification template having fields that match fields included in the target identification may be selected from the preset identification templates. The preset field may be obtained from the selected preset identification template, and information of the preset field may be obtained from a position corresponding to the preset field in the image of the target. For example, a name field may be obtained from the selected preset identification template, in which the name field may be positioned at the top and the leftmost side of the preset identification template. In this example, information positioned at the top and the leftmost side of the identification may be searched in the image of the target identification, in which name information in the target identification may be obtained.

It should be noted that, in some embodiments, the process of comparing the image of the target identification and the preset identification template matching the target identification, and the process of obtaining the information of the preset field may be implemented using a preset algorithm. The preset algorithm may be set according to actual conditions, which may correspond to, for example, methods based on connected components or methods based on stroke width conversion, which is not limited in the present specification. In some embodiments, the process of a text detection method based on stroke width conversion may include: determining a Canny edge of an image; determining stroke width conversion of the image according to direction information of the edge: integrating pixels into connected components according to stroke width information; filtering the connected components by geometric inference (e.g., a depth-width ratio of the connected components, a variance, mean, or median of the connected component strokes, etc.); integrating the connected components into a text line; and partitioning the text line into individual words.

According to the information detection method provided by the present specification, key point information in a target identification may be determined from a target image based on a preset deep learning algorithm. Then, an image of the target identification may be obtained from the target image according to the key point information. Information of a preset field may be determined from the image of the target identification according to the image of the target identification and a preset identification template matching the target identification. Therefore, key points of the target identification in the target image may be detected by the deep learning algorithm, so that the exact location of the target identification in the target image may be obtained, and then by matching the detected target identification with the preset identification template, information of any field or a specified field may be detected. For example, by comparison with the preset identification template, the information of a name field and/or the information of an address field in the target identification may be detected, so that the processing of detecting the information of the key field on the identification may be simplified. Moreover, the solutions are not limited by the type of the identification and may be applied to various types of identifications.

Figure 3:
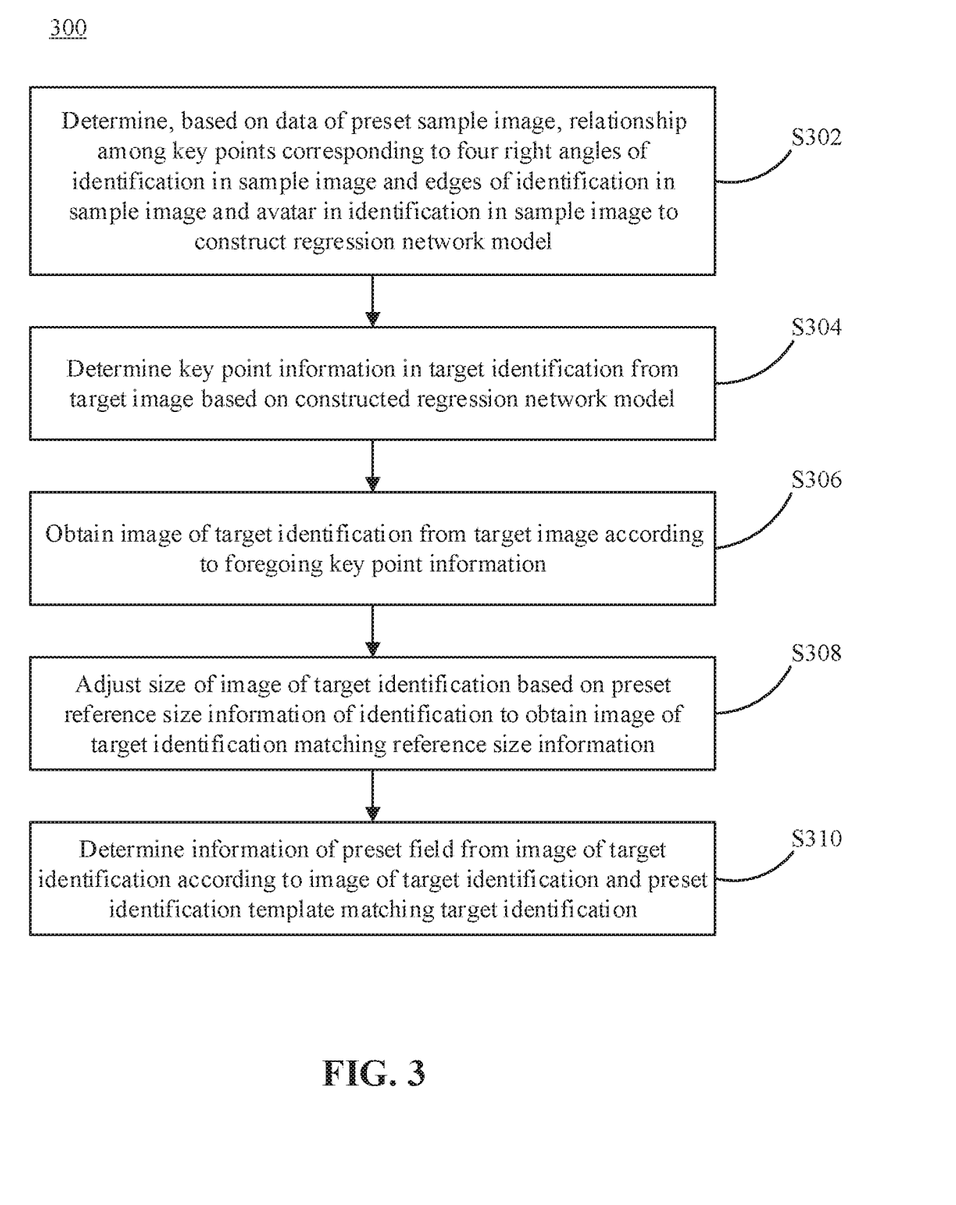
FIG. 3 is a flowchart of another information detection method according to an embodiment.

FIG. 3 is a flowchart of another information detection method 300 according to an embodiment. The method 300 may be executed by a terminal device or a server. The terminal device may be a personal computer or a mobile terminal device (e.g., a mobile phone or a tablet computer). The terminal device may be a terminal device used by a user. The server may be a stand-alone server, or a server cluster formed by multiple servers. Moreover, the server may be a background server of a certain service, or may be a background server of a website (such as a network shopping website or a payment application). The method 300 may be used in the process for detecting the information of a key field on an identification. As an example, the method 300 may be executed by a server to improve the detection efficiency of the information as described in the following embodiments. As another example, the method 300 may be executed by a terminal device, which may be similar to the following embodiments. The method 300 may include the following steps.

In step S302, based on data of a preset sample image, a relationship among key points corresponding to four right angles of an identification in the sample image and edges of the identification in the sample image as well as an avatar in the identification in the sample image is determined to construct a regression network model.

In some embodiments, the data of the sample image may be pixel data of the sample image, such as in the format of 32×32 or 100×100. In some embodiments, the regression network model may be a network model constructed based on a preset deep learning algorithm, and the regression network model may include various types, such as a convolutional neural network model or a deep confidence network model.

In some embodiments, a certain number of sample images may be selected to train the preset deep learning algorithm. The deep learning algorithm may be an input-to-output mapping, which can learn a large number of mapping relationships between input and output without any precise mathematical expression between input and output. As long as a corresponding regression network can be trained with known patterns, the regression network may have the ability to map between input and output pairs. In some embodiments, sample data for the regression network may be formed by vector pairs in the form of (input vector, ideal output vector). Weights may be initialized with some different small random numbers before starting the training. The small random numbers may be used to ensure that the network does not become saturated due to excessive weights, which may lead to a training failure. The difference between the small random numbers can be used to ensure that the network can learn normally. In some embodiments, the training of the deep learning algorithm may include two stages. Stage 1 may be a forward propagation stage, in which a sample data (X, Yp) from a set of sample data may be selected. X may be inputted into a regression network corresponding to the deep learning algorithm, and a corresponding actual output Op may be calculated. Stage 2 may be a backward propagation stage, in which the difference between the actual output Op and a corresponding ideal output Yp may be calculated, and backward propagation may be performed according to an error minimizing method to adjust a weight matrix. The trained regression network model may be obtained after performing the two stages.

Based on the principle of the regression network model corresponding to the deep learning algorithm described above, the preset deep learning algorithm may be used to determine, according to the data of the preset sample image, the relationship among the key points corresponding to the four right angles of the identification in the sample image and edges of the identification in the sample image as well as an avatar in the identification in the sample image, and a regression network model may be constructed on the basis of the relationship. In some embodiments, the constructed regression network model may include five stages. The first stage may include a first convolutional layer, a first pooling layer, and a first dropout layer. The first convolutional layer may perform a convolutional operation, through which the original image features may be enhanced and noise may be reduced. In some embodiments, the first convolutional layer may be formed by one or more feature maps. Each neuron in the feature maps may be connected to the neighborhood of N*M in the input, where N and M are both natural numbers. The first pooling layer may subsample images according to the principle of local correlation of images, which may reduce data to be processed while maintaining useful information. In some embodiments, the features may be pre-defined. The first convolutional layer substantially functions to automatically learn the features, and the first pooling layer may reduce the dimensions while keeping the main features. In some embodiments, the first dropout layer may be not added to the first convolutional layer. However, because the data of the sample image may be limited, for the versatility between the identifications, the first dropout layer may increase the noise and improve the generalization ability.

The second stage can include a second convolutional layer, a second pooling layer, and a second dropout layer. Multiple convolutional layers may be set for the following reason. The features learned by one convolutional layer are often local, and the higher level the convolutional layer is located, the more global the learned features may be, so that the overall features of the edges of the identification can be learnt step by step.

The third stage may include a third convolutional layer and a third dropout layer. In the third stage, noise may be increased while the global features may continue to be learned, and no pooling layer is used for pooling process.

The fourth stage may include a first fully connected layer. The first fully connected layer may include a plurality of cells in which the number of cells may be determined based on a design of the output layer (e.g., 500 cells, and so on). The first fully connected layer may have a function of mapping the learned "distributed feature representation" to a data space of the sample image. The first fully connected layer may be fully connected to an upper layer and may have a certain number of trainable parameters. Like a classical neural network, the first fully connected layer may calculate a dot product between an input vector and a weight vector, add a bias to the dot product, and pass it to the next layer.

The fifth stage may include a second fully connected layer. In some embodiments, the second fully connected layer may include eight cells that may respectively correspond to four points and eight parameters of the identification.

In some embodiments, based on the above description, the regression network model may include a first convolutional layer, a first pooling layer, a first dropout layer, a second convolutional layer, a second pooling layer, a second dropout layer, a third convolutional layer, a third dropout layer, a first fully connected layer, and a second fully connected layer. For example, the first convolutional layer may be connected to an input layer, the second fully connected layer may be connected to an output layer and the layers may be connected in the following order: the first convolutional layer, the first pooling layer, the first dropout layer, the second convolutional layer, the second pooling layer, the second dropout layer, the third convolutional layer, the third dropout layer, the first fully connected layer, and the second fully connected layer.

In some embodiments, the first dropout layer, the second dropout layer, and the third dropout layer may be used to increase preset noise information. For example, the first fully connected layer may include a plurality of cells for mapping a learned distributed feature representation into a space of the sample image. The second fully connected layer may include eight cells that may respectively correspond to the key points corresponding to the four right angles of the identification in the image and eight parameters.

It should be noted that, in some embodiments, in the process of training and subsequent prediction of the regression network model corresponding to the deep learning algorithm, the image may be normalized to avoid a gradient explosion.

Still referring to FIG. 3, in step S304, key point information in the target identification is determined from the target image based on the constructed regression network model.

In some embodiments, after constructing the regression network model in the step S302, the data of the target image (e.g., pixel data of the target image) may be input into the constructed regression network model for calculation, from which the relationship among the key points corresponding to the four right angles of the target identification in the target image and edges of the target identification as well as an avatar in the target identification may be determined, and the key point information in the target identification may also be determined.

The processing manner of the step S304 may be various. In order to improve the accuracy of the target identification detection, in some embodiments, key point detection based on small patches may be performed additionally. For example, the regions of the four right angles in the detected target identification may be extracted, and the calculation of the key point detection may be performed on the regions of the four right angles in the target identification (e.g., the processing of the five stages as described above). Thus, more accurate key point information in the target identification may be obtained, so that the accuracy of the key point detection may be greatly improved. In some embodiments, the step S304 may include the following step 1 and step 2.

In step 1, a region formed by the four right angles of the target identification is determined from the target image based on the constructed regression network model.

Figure 4:
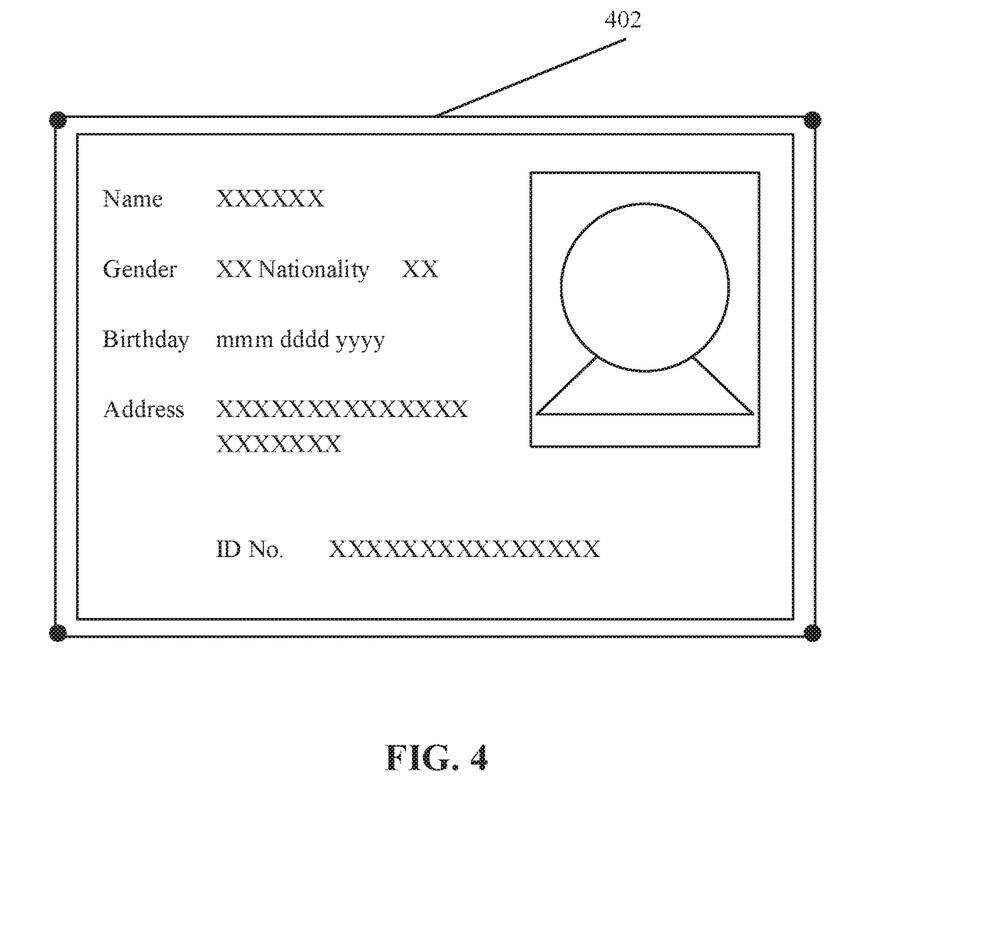
FIG. 4 is a schematic diagram of a region formed by four right angles of a target identification according to an embodiment.

FIG. 4 is a schematic diagram of a region formed by four right angles of a target identification according to an embodiment. In some embodiments, as shown in FIG. 2 and FIG. 4, the data of the target image (e.g., the pixel data of the target image 202) may be input into the constructed regression network model for calculation. For example, the pixel data of the target image may be input to the first convolutional layer of the first stage of the regression network model for calculation. An output result may be input to the first pooling layer for pooling processing. The pooled data may be input to the first dropout layer for processing, thus obtaining a corresponding processing result. The processing result may be subjected to the processing of the second stage, the third stage, the fourth stage, and the fifth stage, respectively, and the key point information corresponding to the four right angles of the target identification 402 may be obtained. Then, based on the key point information corresponding to the four right angles of the target identification 402, a region (e.g., the region as shown in FIG. 4) formed by the four right angles of the target identification 402 may be determined.

In step 2, based on the constructed regression network model, key point information in the target identification is determined from the determined region formed by the four right angles of the target identification.

Figure 5:
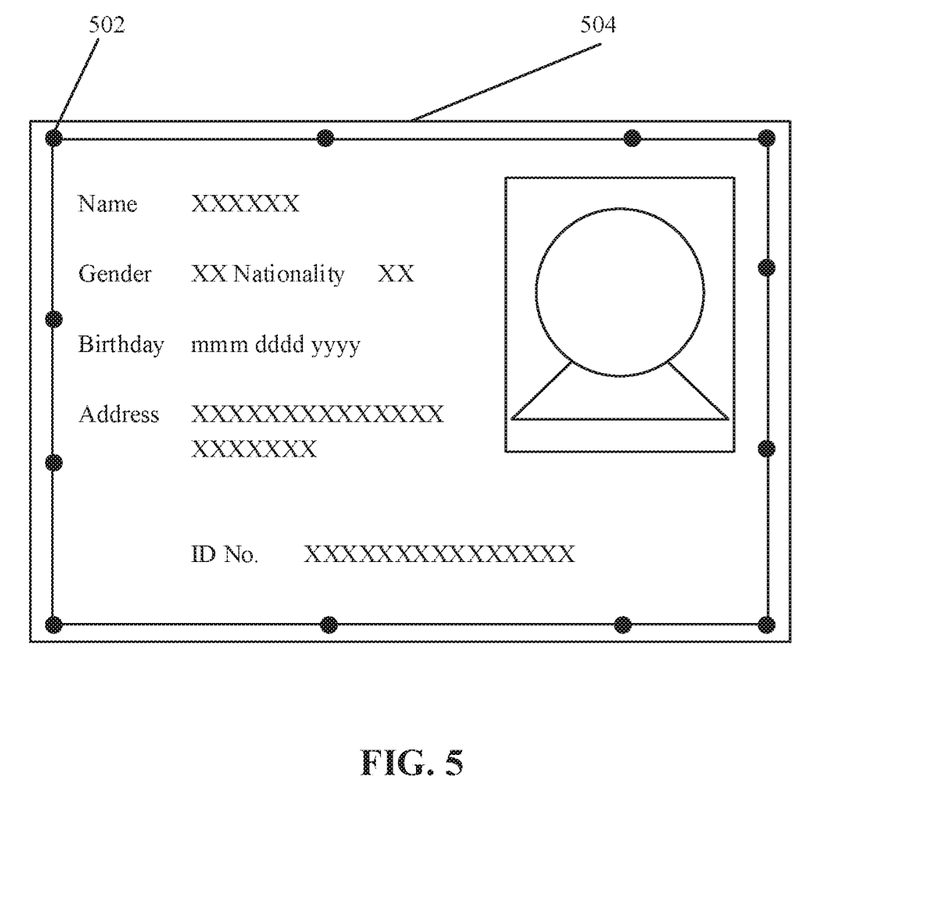
FIG. 5 is a schematic diagram of key points in a target identification obtained based on a region formed by four right angles of the target identification according to an embodiment.

FIG. 5 is a schematic diagram of key points 502 in the target identification 504 obtained based on the region formed by the four right angles of the target identification according to an embodiment. In some embodiments, the region formed by four right angles of the target identification 504 may be used as an initial image, and input into the regression model again for calculation. For example, the processing of the first stage, the second stage, the third stage, the fourth stage, and the fifth stage may be respectively performed on pixel data of an image of the region formed by the four right angles of the target identification 504, thus obtaining key point information in the target identification 504 in the image of the region formed by the four right angles of the target identification 504, as shown in FIG. 5. Through the processing process, the key point information in the target identification 504 may be more accurate.

Still referring to FIG. 3, in step S306, an image of the target identification is obtained from the target image according to the key point information.

In some embodiments, after the image of the target identification is obtained from the target image through the processing process, the image of the target identification may be subjected to affine transformation correction which will be detailed in the step S308.

In the step S308, based on preset reference size information of the identification, the size of the image of the target identification is adjusted to obtain an image of the target identification matching the reference size information.

In some embodiments, the reference size information may be real size (or standard size) information of the target identification in actual application or may be information of a size matching the real size.

In step S310, information of a preset field is determined from the image of the target identification according to the image of the target identification and a preset identification template matching the target identification.

In some embodiments, the preset identification template may be an identification template set based on any of a reference size, a standard size, or a real size. For example, the preset field may be any field in the target identification, such as a name field or a gender field.

In some embodiments, according to the identification template of the reference size (or the standard size or the real size), a required field and a range of pixel values of its corresponding region may be configured. For example, the following rules may be set: the name field may start from pixel coordinates (100, 50) and end at pixel coordinates (180, 90): the gender field may start from pixel coordinates (100, 100) and end at pixel coordinates (140, 140); and the pixel coordinates of the name field may be located above the pixel coordinates of the gender field.

In some embodiments, template correction may further be performed on the above-mentioned preset identification template, and in the identification template of the reference size (or the standard size, or the real size), a text line in the target identification may be identified by a connected-component based method or the like. Moreover, the target identification and the preset identification template matching the target identification may be compared for a difference, and connected components of the preset field may be extracted and corrected by a connected-component based method or the like. For example, information of some fields may be written across lines, so that corresponding rules or the like may be configured directly through the configuration of the template.

Figure 6:
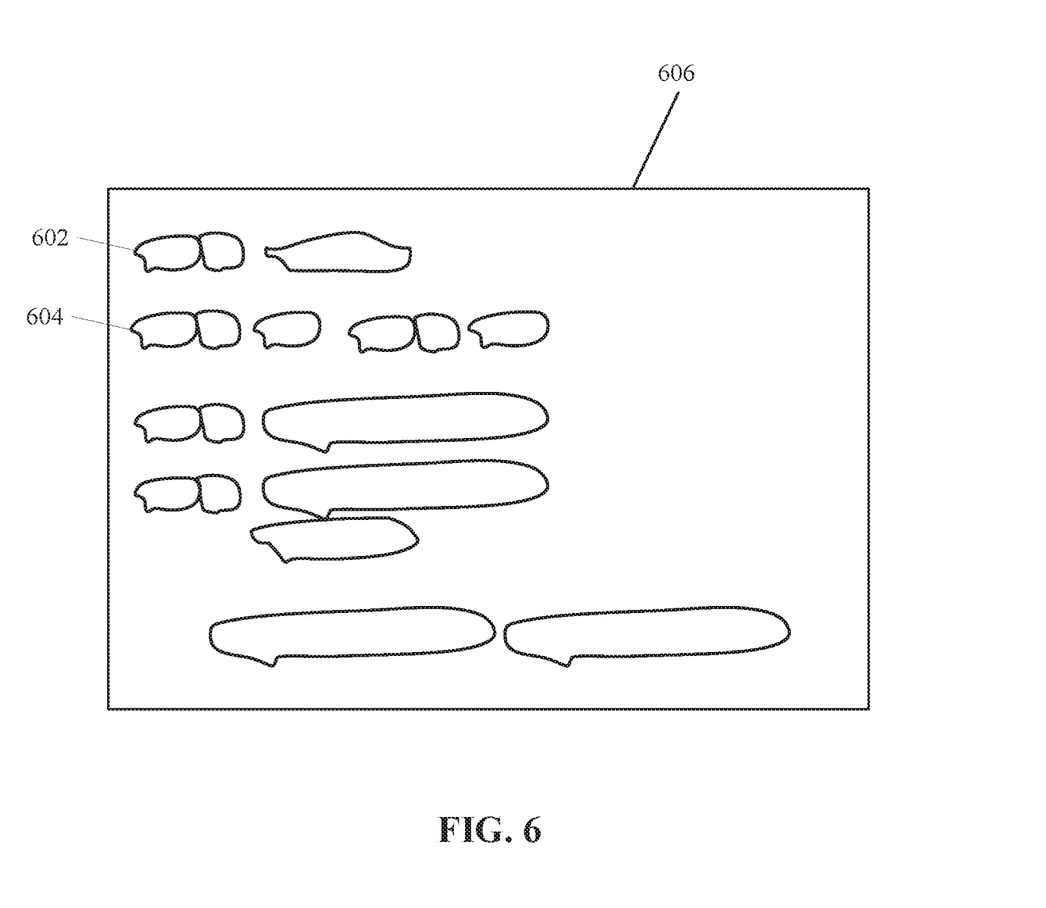
FIG. 6 is a schematic diagram of a matching result after matching a preset identification template according to an embodiment.

FIG. 6 is a schematic diagram of a matching result after matching a preset identification template according to an embodiment. As shown in FIG. 6, a text line, such as a text line 602 of the name field and a text line 604 of the gender field, may be extracted according to the template matching result to obtain corresponding information of the preset field in a target identification 606.

According to the information detection method provided by the present specification, key point information in a target identification may be determined from a target image based on a preset deep learning algorithm. Then, an image of the target identification may be obtained from the target image according to the key point information. Information of a preset field may be determined from the image of the target identification according to the image of the target identification and a preset identification template matching the target identification. Therefore, key points of the target identification in the target image may be detected by the deep learning algorithm, so that the exact location of the target identification in the target image may be obtained, and then by matching the detected target identification with the preset identification template, information of any field or a specified field may be detected. For example, by comparison with the preset identification template, the information of a name field and/or the information of an address field in the target identification may be detected, so that the processing of detecting the information of the key field on the identification may be simplified. Moreover, the solutions are not limited by the type of the identification and may be applied to various types of identifications.

Figure 7:
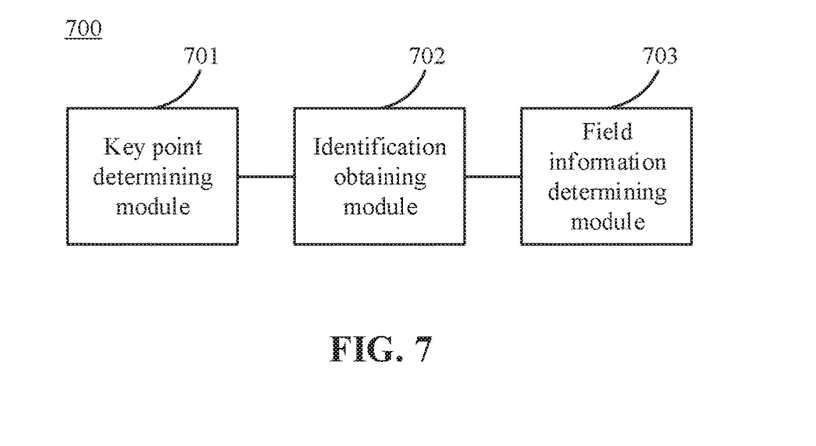
FIG. 7 shows an information detection apparatus according to an embodiment.

Based on the information detection method as described, the present specification further provides an information detection apparatus, as shown in FIG. 7. FIG. 7 shows an information detection apparatus 700 according to an embodiment.

The information detection apparatus 700 includes: a key point determining module 701, an identification obtaining module 702 and a field information determining module 703.

The key point determining module 701 may be configured to determine key point information in a target identification from a target image based on a preset deep learning algorithm.

The identification obtaining module 702 may be configured to obtain an image of the target identification from the target image according to the key point information.

The field information determining module 703 may be configured to determine information of a preset field from the image of the target identification according to the image of the target identification and a preset identification template matching the target identification.

In some embodiments, the key point determining module 701 may include a model constructing unit and a key point determining unit.

The model constructing unit may be configured to determine, based on data of a preset sample image, a relationship among key points corresponding to four right angles of an identification in the sample image and edges of the identification in the sample image as well as an avatar in the identification in the sample image to construct a regression network model.

The key point determining unit may be configured to determine key point information in the target identification from the target image based on the constructed regression network model.

In some embodiments, the regression network model may include a first convolutional layer, a first pooling layer, a first dropout layer, a second convolutional layer, a second pooling layer, a second dropout layer, a third convolutional layer, a third dropout layer, a first fully connected layer, and a second fully connected layer. For example, the first convolutional layer may be connected to an input layer, the second fully connected layer may be connected to an output layer, and the layers may be connected in the following order: the first convolutional layer, the first pooling layer, the first dropout layer, the second convolutional layer, the second pooling layer, the second dropout layer, the third convolutional layer, the third dropout layer, the first fully connected layer, and the second fully connected layer.

In some embodiments, the first dropout layer, the second dropout layer, and the third dropout layer may be used to increase preset noise information.

In some embodiments, the first fully connected layer may include a plurality of cells for mapping a learned distributed feature representation into a space of the sample image.

In some embodiments, the second fully connected layer may include eight cells that respectively correspond to the key points corresponding to the four right angles of the target identification and eight parameters.

In some embodiments, the key point determining unit may be configured to determine, based on the constructed regression network model, a region formed by the four right angles of the target identification from the target image, and determine, based on the constructed regression network model, key point information in the target identification from the determined region formed by the four right angles of the target identification.

In some embodiments, the apparatus 700 may further include an image adjusting module, which may be configured to adjust the size of the image of the target identification based on preset reference size information of the identification to obtain an image of the target identification matching the reference size information.

According to the information detection apparatus 700 provided by the present specification, key point information in a target identification may be determined from a target image based on a preset deep learning algorithm. Then, an image of the target identification may be obtained from the target image according to the key point information. Information of a preset field may be determined from the image of the target identification according to the image of the target identification and a preset identification template matching the target identification. Therefore, key points of the target identification in the target image may be detected by the deep learning algorithm, so that the exact location of the target identification in the target image may be obtained. Then by matching the detected target identification with the preset identification template, information of any field or a specified field may be detected. For example, by comparison with the preset identification template, the information of a name field and/or the information of an address field in the target identification may be detected, so that the processing of detecting the information of the key field on the identification may be simplified. Moreover, the solutions are not limited by the type of the identification and may be applied to various types of identifications.

Figure 8:
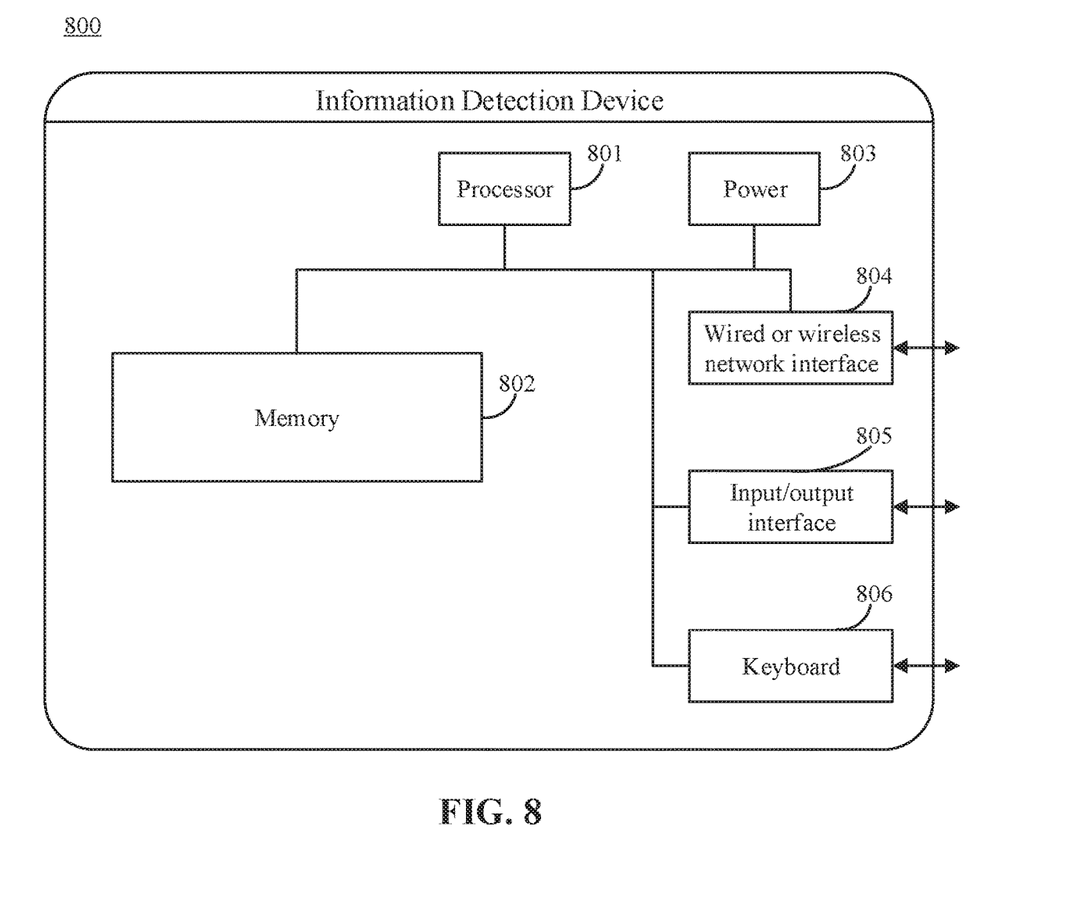
FIG. 8 shows an information detection device according to an embodiment.

Based on the information detection apparatus, the present specification further provides an information detection device, as shown in FIG. 8. FIG. 8 shows an information detection device 800 according to an embodiment.

The information detection device 800 may be the server or the terminal device provided by the foregoing embodiments.

The information detection device 800 may vary considerably depending on different configurations or performances, and may include one or more processors 801 and a memory 802. The memory 802 may store one or more stored applications or data. In some embodiments, the memory 802 may be a non-permanent memory or a permanent memory. The application stored in the memory 802 may include one or more modules (not shown), each of which may include a series of computer executable instructions for the information detection device 800. Still further, the processor 801 may be configured to communicate with the memory 802 to execute, on the information detection device, a series of computer executable instructions in the memory 802. In some embodiments, the information detection device may also include one or more power sources 803, one or more wired or wireless network interfaces 804, one or more input/output interfaces 805, and one or more keyboards 806.

In an embodiment, the information detection device 800 may include a memory and one or more programs, wherein the one or more programs may be stored in the memory, the one or more programs may include one or more modules, and each module may include a series of computer executable instructions for the information detection device. Through configuration, one or more processors may execute the one or more programs, including performing the following computer executable instructions: determining key point information in a target identification from a target image based on a preset deep learning algorithm; obtaining an image of the target identification from the target image according to the key point information; and determining information of a preset field from the image of the target identification according to the image of the target identification and a preset identification template matching the target identification.

In some embodiments, the determining key point information in a target identification from a target image based on a preset deep learning algorithm may include: determining, based on data of a preset sample image, a relationship among key points corresponding to four right angles of an identification in the sample image and edges of the identification in the sample image as well as an avatar in the identification in the sample image to construct a regression network model; and determining key point information in the target identification from the target image based on the constructed regression network model.

In some embodiments, the regression network model may include a first convolutional layer, a first pooling layer, a first dropout layer, a second convolutional layer, a second pooling layer, a second dropout layer, a third convolutional layer, a third dropout layer, a first fully connected layer, and a second fully connected layer. For example, the first convolutional layer may be connected to an input layer, the second fully connected layer may be connected to an output layer, and the layers may be connected in the following order: the first convolutional layer, the first pooling layer, the first dropout layer, the second convolutional layer, the second pooling layer, the second dropout layer, the third convolutional layer, the third dropout layer, the first fully connected layer, and the second fully connected layer.

In some embodiments, the first dropout layer, the second dropout layer, and the third dropout layer may be used to increase preset noise information.

In some embodiments, the first fully connected layer may include a plurality of cells for mapping a learned distributed feature representation into a space of the sample image.

In some embodiments, the second fully connected layer may include eight cells that respectively correspond to the key points corresponding to the four right angles of the target identification and eight parameters.

In some embodiments, the determining key point information in the target identification from the target image based on the constructed regression network model may include: determining, based on the constructed regression network model, a region formed by the four right angles of the target identification from the target image; and determining, based on the constructed regression network model, key point information in the target identification from the determined region formed by the four right angles of the target identification.

In some embodiments, before determining the information of the preset field from the image of the target identification according to the image of the target identification and the preset identification template matching the target identification, the following step may be further included: adjusting the size of the image of the target identification based on preset reference size information of the identification to obtain an image of the target identification matching the reference size information.

According to the information detection device 800 provided by the present specification, key point information in a target identification may be determined from a target image based on a preset deep learning algorithm. Then, an image of the target identification may be obtained from the target image according to the key point information. Information of a preset field may be determined from the image of the target identification according to the image of the target identification and a preset identification template matching the target identification. Therefore, key points of the target identification in the target image may be detected by the deep learning algorithm, so that the exact location of the target identification in the target image may be obtained. Then by matching the detected target identification with the preset identification template, information of any field or a specified field may be detected. For example, by comparison with the preset identification template, the information of a name field and/or the information of an address field in the target identification may be detected, so that the processing of detecting the information of the key field on the identification may be simplified. Moreover, the solutions are not limited by the type of the identification and may be applied to various types of identifications.

The specific embodiments of the specification are described as above. Other embodiments are within the scope of the claims appended. In some cases, actions or steps recited in the claims may be performed in a different order than that in the embodiments and still achieve the desired results. In addition, the processes depicted in the figures are not necessarily in a particular order or in a sequential order to achieve the desired results. In some embodiments, multitasking processing and parallel processing are also possible or may be advantageous.

Each of the above described methods, modules, and units may be implemented as software, or hardware, or a combination of software and hardware. For example, a Programmable Logic Device (PLD) (e.g., a Field Programmable Gate Array (FPGA)) may be such an integrated circuit, the logic function of which may be determined by a user through programming the device. Designers may program to integrate a digital system on a PLD without asking a chip manufacturer for designing and fabricating a dedicated integrated circuit chip. Moreover, instead of manually making integrated circuit chips, this programming may be implemented using logic compiler software which may be similar to a software compiler used in programming development. Moreover, to compile previous original codes, a specific programming language called Hardware Description Language (HDL) may be used. There may be many HDLs, such as Advanced Boolean Expression Language (ABEL), Altera Hardware Description Language (AHDL). Confluence. Cornell University Programming Language (CUPL), HDCal, Java Hardware Description Language (JHDL), Lava, Lola, MyHDL, PALASM, Ruby Hardware Description Language (RHDL), or the like. Very-High-Speed Integrated Circuit Hardware Description Language (VHDL) and Verilog are commonly used. It should also be apparent to those skilled in the art that a hardware circuit for implementing a logic process may be easily obtained by simply logically programming the process with a few hardware description languages described above and programming it into an integrated circuit.

A controller can be implemented in any suitable manner in the above described devices. For example, the controller can take the form of, a microprocessor or processor, a computer-readable medium storing a program code (e.g., software or firmware) executable by the (micro)processor, a logic gate, a switch, an Application Specific Integrated Circuit (ASIC), a programmable logic controller, or an embedded microcontroller. Examples of the controller may include, but are not limited to, the following microcontrollers: ARC 625D, Atmel AT91SAM. Microchip PIC 18F26K20 and Silicone Labs C8051F320. A memory controller can also be implemented as a part of the memory's control logic. Those skilled in the art will also appreciate that in addition to implementing the controller by a purely computer-readable program code, the controller may achieve the same function in the format of a logic gate, a switch, an ASIC, a programmable logic controller, an embedded microcontroller or the like by logically programming process steps. Such a controller may therefore be considered as a hardware component, and an apparatus included in the controller and configured to implement various functions may also be considered as a structure within the hardware component. Or, an apparatus for implementing various functions may be considered as both a software module for an implementation method and a structure within a hardware component.

The devices, apparatuses, modules or units illustrated in the above embodiments may specifically be implemented by a computer chip or an entity, or by a product having a certain function. A typical implementation device may be a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, the above devices are described separately as various units divided by function. In some embodiments, the functions of the various units may be implemented in one or more pieces of software and/or hardware.

Those skilled in the art should understand that embodiments of the present specification may be provided as a method, a system, or a computer program product. Accordingly, the embodiments may take the form of an entirely hardware embodiment, an entirely software embodiment, or an embodiment combining software and hardware. Moreover, a computer program product may be implemented on one or more computer usable storage media (including, but not limited to, disk memories, CD-ROMs and optical memories) comprising computer usable program codes.

The embodiments are described with reference to the flowcharts and/or the block diagrams of a method, a device (system), and a computer program product. It should be understood that each process and/or block in the flowcharts and/or block diagrams, and combinations of the processes and/or blocks in the flowcharts and/or the block diagrams, may be implemented by computer program instructions. These computer program instructions may be provided to a processor of a general-purpose computer, a special-purpose computer, an embedded processor, or other programmable data processing devices to produce a machine such that instructions may be executed by the processor of the computer or other programmable data processing devices to generate an apparatus for implementing the functions specified in one or more processes in the flowcharts and/or one or more blocks in the block diagrams.

These computer program instructions may also be stored in a computer-readable storage medium that may direct a computer or other programmable data processing devices to function in a particular manner such that the instructions stored in the computer-readable storage medium may produce an article of manufacture including an instruction means which implements functions specified in one or more processes in the flowcharts and/or one or more blocks in the block diagrams.

These computer program instructions may also be loaded onto a computer or other programmable data processing devices to cause a series of operating steps to be performed on the computer or other programmable devices to produce computer-implemented processing, and the instructions executed on the computer or other programmable devices may provide steps for implementing the functions specified in one or more processes in the flowcharts and/or one or more blocks in the block diagrams.

The computer-readable storage medium may include volatile and non-volatile, removable and non-removable media and may store information by any method or technology. The information may be a computer-readable instruction, a data structure, a module of a program, or other data. Examples of the computer-readable storage medium may include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a magnetic tape cassette, a magnetic tape/disk storage or other magnetic storage devices, or any other non-transmission medium, and may be used for storing information accessible by computing devices. The computer-readable media do not include transitory media, such as modulated data signals and carriers.

It should be further noted that the term "include." "comprise" or any other variations thereof are intended to cover non-exclusive inclusions such that a process, method, article, or device that includes a series of elements not only includes those elements but also includes other elements that are not listed explicitly, or also includes inherent elements of the process, method, article, or device. In the absence of more limitations, an element defined by the sentence "including a/an . . . " does not exclude that the process, method, article or device including the element further has other identical elements.

The above described methods may be implemented by computer executable instructions executed by a computer, such as program modules. Generally, the program modules may include routines, programs, objects, components, data structures, or the like that perform particular tasks or implement particular abstract data types. The above described methods may also be implemented in distributed computing environments where tasks may be performed by remote processing devices that are connected through a communication network. In a distributed computing environment, program modules may be located in both local and remote computer storage media including storage devices.

The various embodiments are described in a progressive manner, and the same or similar parts between the various embodiments may be referenced to each other, in which each embodiment focuses on differences from other embodiments. In particular, because the device/apparatus embodiments are basically similar to the method embodiments, they are described in a relatively simple way, and the description of the method embodiments may be referred to for relevant parts.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A method for information detection, comprising:
   determining key point information in a target identification from a target image based on a relationship between key points corresponding to four right angles of an identification in a sample image and edges of the identification in the sample image as well as an identification photo in the identification in the sample image;
   obtaining an image of the target identification contained in the target image according to the key point information; and
   determining information of a preset field from the image of the target identification according to the image of the target identification and a preset identification template matching the target identification,
   wherein the determining the key point information in the target identification from the target image comprises:
   determining, based on data of the sample image, the relationship between key points corresponding to four right angles of the identification in the sample image and edges of the identification in the sample image as well as an identification photo in the identification in the sample image, to construct a regression network model;
   determining, based on the constructed regression network model, a region formed by four right angles of the target identification from the target image; and
   determining, based on the constructed regression network model, the key point information in the target identification from the determined region formed by the four right angles of the target identification.

2. The method according to claim 1, wherein the regression network model comprises a first convolutional layer, a first pooling layer, a first dropout layer, a second convolutional layer, a second pooling layer, a second dropout layer, a third convolutional layer, a third dropout layer, a first fully connected layer, and a second fully connected layer, wherein the first convolutional layer is connected to an input layer, the second fully connected layer is connected to an output layer, and layers are connected in an order of: the first convolutional layer, the first pooling layer, the first dropout layer, the second convolutional layer, the second pooling layer, the second dropout layer, the third convolutional layer, the third dropout layer, the first fully connected layer, and the second fully connected layer.

3. The method according to claim 2, wherein the first dropout layer, the second dropout layer, and the third dropout layer are configured to increase preset noise information.

4. The method according to claim 3, wherein the first fully connected layer comprises a plurality of cells for mapping a learned distributed feature representation into a space of the sample image.

5. The method according to claim 4, wherein the second fully connected layer comprises eight cells, and the eight cells respectively correspond to the key points corresponding to four right angles of the target identification and eight parameters.

6. The method according to claim 1, wherein before determining the information of the preset field from the image of the target identification according to the image of the target identification and the preset identification template matching the target identification, the method further comprises:
   adjusting a size of the image of the target identification based on preset reference size information of the identification to obtain the image of the target identification matching the reference size information.

7. A device for information detection, comprising:
   a processor; and
   a memory configured to store instructions,
   wherein the processor is configured to execute the instructions to:
   determine key point information in a target identification from a target image based on a relationship between key points corresponding to four right angles of an identification in a sample image and edges of the identification in the sample image as well as an identification photo in the identification in the sample image;
   obtain an image of the target identification contained in the target image according to the key point information; and
   determine information of a preset field from the image of the target identification according to the image of the target identification and a preset identification template matching the target identification,
   wherein in determining the key point information in the target identification from the target image, the processor is further configured to execute the instructions to:
   determine, based on data of the sample image, the relationship between key points corresponding to four right angles of the identification in the sample image and edges of the identification in the sample image as well as an identification photo in the identification in the sample image, to construct a regression network model;
   determine, based on the constructed regression network model, a region formed by four right angles of the target identification from the target image; and
   determine, based on the constructed regression network model, the key point information in the target identification from the determined region formed by the four right angles of the target identification.

8. The device according to claim 7, wherein the regression network model comprises a first convolutional layer, a first pooling layer, a first dropout layer, a second convolutional layer, a second pooling layer, a second dropout layer, a third convolutional layer, a third dropout layer, a first fully connected layer, and a second fully connected layer, wherein the first convolutional layer is connected to an input layer, the second fully connected layer is connected to an output layer, and layers are connected in an order of: the first convolutional layer, the first pooling layer, the first dropout layer, the second convolutional layer, the second pooling layer, the second dropout layer, the third convolutional layer, the third dropout layer, the first fully connected layer, and the second fully connected layer.

9. The device according to claim 8, wherein the first dropout layer, the second dropout layer, and the third dropout layer are configured to increase preset noise information.

10. The device according to claim 9, wherein the first fully connected layer comprises a plurality of cells for mapping a learned distributed feature representation into a space of the sample image.

11. The device according to claim 10, wherein the second fully connected layer comprises eight cells, and the eight cells respectively correspond to the key points corresponding to four right angles of the target identification and eight parameters.

12. The device according to claim 7, wherein the processor is further configured to execute the instructions to:
adjust a size of the image of the target identification based on preset reference size information of the identification to obtain the image of the target identification matching the reference size information.

13. A non-transitory computer-readable storage medium having stored therein instructions that, when executed by a processor of a device, cause the device to:
determine key point information in a target identification from a target image based on a relationship between key points corresponding to four right angles of an identification in a sample image and edges of the identification in the sample image as well as an identification photo in the identification in the sample image;
obtain an image of the target identification contained in the target image according to the key point information; and
determine information of a preset field from the image of the target identification according to the image of the target identification and a preset identification template matching the target identification,
wherein determining the key point information in the target identification from the target image comprises:
determining, based on data of the sample image, the relationship between key points corresponding to four right angles of the identification in the sample image and edges of the identification in the sample image as well as an identification photo in the identification in the sample image, to construct a regression network model;
determining, based on the constructed regression network model, a region formed by four right angles of the target identification from the target image; and
determining, based on the constructed regression network model, the key point information in the target identification from the determined region formed by the four right angles of the target identification.

* * * * *